(12) United States Patent
Kuwabara

(10) Patent No.: US 8,852,036 B2
(45) Date of Patent: Oct. 7, 2014

(54) BASEBALL OR SOFTBALL BAT, AND METHOD FOR MANUFACTURING A BASEBALL OR SOFTBALL BAT

(71) Applicant: Mizuno Corporation, Osaka (JP)

(72) Inventor: Hiroaki Kuwabara, Gifu-ken (JP)

(73) Assignee: Mizuno Corporation, Osaka (JP)

( * ) Notice: Subject to any disclaimer, the term of this patent is extended or adjusted under 35 U.S.C. 154(b) by 127 days.

(21) Appl. No.: 13/625,401

(22) Filed: Sep. 24, 2012

(65) Prior Publication Data

US 2013/0085022 A1   Apr. 4, 2013

(30) Foreign Application Priority Data

Sep. 30, 2011 (JP) ................. 2011-218049

(51) Int. Cl.
- *A63B 59/06* (2006.01)
- *B29C 53/58* (2006.01)
- *B29L 31/52* (2006.01)
- *B29C 70/28* (2006.01)

(52) U.S. Cl.
CPC ............... *A63B 59/06* (2013.01); *B29C 53/58* (2013.01); *B29L 2031/52* (2013.01); *A63B 2209/02* (2013.01); *B29C 70/28* (2013.01)
USPC ......................................... 473/564

(58) Field of Classification Search
USPC .................. 473/564, 563, 565, 520; D21/753
See application file for complete search history.

(56) References Cited

U.S. PATENT DOCUMENTS

| | | | |
|---|---|---|---|
| 6,824,482 B1 | 11/2004 | Tribble | |
| 7,381,141 B2 * | 6/2008 | Van Nguyen | 473/566 |
| 7,749,114 B2 * | 7/2010 | Thouin | 473/520 |
| 2004/0077439 A1 * | 4/2004 | Eggiman et al. | 473/567 |
| 2005/0070383 A1 | 3/2005 | Chang | |
| 2005/0288130 A1 * | 12/2005 | Lefebvre et al. | 473/457 |
| 2007/0155546 A1 * | 7/2007 | Chauvin et al. | 473/520 |

(Continued)

FOREIGN PATENT DOCUMENTS

| | | |
|---|---|---|
| JP | 2003-290404 | 10/2003 |
| JP | 2004-113557 | 4/2004 |
| JP | 2005-103219 | 4/2005 |
| JP | 2011139856 A1 * | 7/2011 |

OTHER PUBLICATIONS

Machine Translation of JP2002-282550, 2014, 18 pages.*
Machine Translation of JP2002-093617, 2014, 22 pages.*

(Continued)

*Primary Examiner* — Gene Kim
*Assistant Examiner* — M Chambers
(74) *Attorney, Agent, or Firm* — Marsh Fischmann & Breyfogle LLP

(57) ABSTRACT

A baseball or softball bat and a method for manufacturing the bat are provided. The bat includes a batting portion formed of wood into a cylindrical shape, and a bat main body made of a fiber-reinforced plastic. A part of the bat main body is inserted in the batting portion from an open end of the batting portion, and the rest of the bat main body is exposed from the batting portion. The bat further includes a suppressing member arranged on an outer circumference of the bat main body. The suppressing member prevents change of orientation of fibers in the fiber-reinforced plastic. The suppressing member is positioned so as to contact a step formed between the outer circumference of the bat main body and an outer circumference of the batting portion at the open end of the batting portion.

5 Claims, 3 Drawing Sheets

(56) References Cited

U.S. PATENT DOCUMENTS

2007/0207882 A1* 9/2007 Van Nguyen ............... 473/564
2008/0058132 A1* 3/2008 Nguyen ..................... 473/564
2008/0176025 A1* 7/2008 Xu ............................. 428/106
2011/0098141 A1 4/2011 Burger
2013/0085022 A1* 4/2013 Kuwabara ................. 473/564

OTHER PUBLICATIONS

Machine Translation of JP2011-139856, 2014, 12 pages.*
Office Action issued by the Japanese Patent Office pertaining to Japanese Application No. 2011-218049.

* cited by examiner

BASEBALL OR SOFTBALL BAT, AND METHOD FOR MANUFACTURING A BASEBALL OR SOFTBALL BAT

BACKGROUND OF THE INVENTION

The present invention relates to a baseball or softball bat that is formed of a composite material including wood and a fiber-reinforced plastic, and a method for manufacturing the same.

Conventionally, baseball or softball bats (hereinafter, referred to as bats) are manufactured by a single material such as wood, metal, or a fiber-reinforced plastic. In recent years, it has been desired to reduce the use of wood due to a lack of optimal wood resources or to improve the feeling of use at an impact. Therefore, instead of manufacturing bats with a single material, bats have been proposed that use wood at a batting portion and a fiber-reinforced plastic or metal at portions other than the batting portion and have a composite structure in which these different materials are joined. In this kind of bat, however, the strength at a joint surface between the different materials is insufficient. Thus, when stress caused by batting a ball with the batting portion acts on the joint surface, the joining state of the materials at the joint surface deteriorates.

To solve this problem, Japanese Laid-Open Patent Publication No. 2004-113557 proposes a bat that has improved shock resistance and durability. That is, a reinforcing member is provided on the outer circumference of the joint surface to add strength to the joint surface. According to the bat disclosed in Japanese Laid-Open Patent Publication No. 2004-113557, a bat main body 91, which is formed of a fiber-reinforced plastic into a hollow shape, is inserted in a batting portion 90 formed of wood into a cylindrical shape as shown in FIG. 7a. The bat main body 91 includes an insertion section and an exposed section, which are integrally formed. The insertion section includes a batting core portion 92, the outer circumference of which is covered by the batting portion 90. The exposed section, which is exposed from the batting portion 90, includes a tapered portion 93, a grip portion 94, and a grip end portion 95. As shown in FIG. 7b, a reinforcing member 96 is wound about a boundary portion between the batting portion 90 and the tapered portion 93. The reinforcing member 96 covers the section in the vicinity of the lower end of the batting portion 90 and the section in the vicinity of the upper end of the tapered portion 93.

The bat disclosed in Japanese Laid-Open Patent Publication No. 2004-113557 is molded as described below. The bat is placed in a metal mold in a state in which the batting core portion 92 of the bat main body 91 is inserted in the batting portion 90, and the reinforcing member 96 is wound about the outer circumference of the boundary portion between the batting portion 90 and the tapered portion 93. Then, compressed air is injected in the bat main body 91 of the bat placed in the metal mold before being molded so that pressure is applied to the bat main body 91 from the interior, and the metal mold is heated at the same time. In this manner, the bat main body 91, which is formed of a fiber-reinforced plastic, is joined to the batting portion 90, which is made of wood.

The lower end of the batting portion 90 has a thickness in the radial direction. Thus, a step 97 is formed at the boundary portion between the batting portion 90 and the tapered portion 93. Therefore, according to the bat molded as described above, the bat main body 91 is undesirably enlarged in the radial direction along the shape of the step 97 in the vicinity of the lower end of the batting portion 90 due to the pressure applied from the interior of the bat main body 91. As a result, the orientation of the fibers in the fiber-reinforced plastic is rapidly changed at sections above and below the boundary portion between the batting portion 90 and the tapered portion 93. That is, the orientation of the fibers in the fiber-reinforced plastic arranged in the longitudinal direction of the bat is significantly changed in the radial direction of the bat.

In such conventional bats, stress caused when batting a ball with the batting portion 90 is intensively applied to the vicinity of the boundary portion between the batting portion 90 and the tapered portion 93. Therefore, in such bats, the strength of the bat cannot be maintained in a suitable manner although the outer circumference of the boundary portion is covered by the reinforcing member 96. The reinforcing member 96 cannot efficiently improve the joining state of the joint surface of the different materials at the boundary portion, and such bats have problems with shock resistance and durability.

SUMMARY OF THE INVENTION

Accordingly, it is an objective of the present invention to provide a baseball or softball bat formed of a composite material that has an improved strength at a boundary portion including a joint surface of different materials. Furthermore, another objective is to provide a method for manufacturing the baseball or softball bat formed of a composite material that has an improved strength at the boundary portion including the joint surface of different materials.

To achieve the foregoing objective, and in accordance with one aspect of the present invention, a baseball or softball bat is provided. The bat includes a batting portion formed of wood into a cylindrical shape, and a bat main body made of a fiber-reinforced plastic. A part of the bat main body is inserted in the batting portion from an open end of the batting portion, and the rest of the bat main body is exposed from the batting portion. The bat further includes a suppressing member arranged on an outer circumference of the bat main body. The suppressing member prevents change of orientation of fibers in the fiber-reinforced plastic. The suppressing member is positioned so as to contact a step formed between the outer circumference of the bat main body and an outer circumference of the batting portion at the open end of the batting portion.

In accordance with another aspect of the present invention, a method for manufacturing a baseball or softball bat is provided. The bat includes a batting portion formed of wood into a cylindrical shape, and a bat main body made of a fiber-reinforced plastic. A part of the bat main body is inserted in the batting portion from an open end of the batting portion, and the rest of the bat main body is exposed from the batting portion. The manufacturing method includes: inserting the bat main body in the batting portion; mounting a suppressing member on an outer circumference of the bat main body such that the suppressing member contacts a step formed between the outer circumference of the bat main body and an outer circumference of the batting portion at the open end of the batting portion, wherein the suppressing member prevents change of orientation of fibers in the fiber-reinforced plastic; and molding the bat by arranging the batting portion, the bat main body, and the suppressing member in a metal mold and heating under pressure.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7b is an enlarged cross-sectional view of the conventional bat shown in FIG. 7a.

DETAILED DESCRIPTION OF THE PREFERRED EMBODIMENTS

A bat 1 according to one embodiment will now be described with reference to FIGS. 1 to 5c. The head of the bat 1 is defined as an upper end, and a grip end portion 7 of the bat 1 is defined as a lower end.

(Structure of Bat 1)

Figure 1:
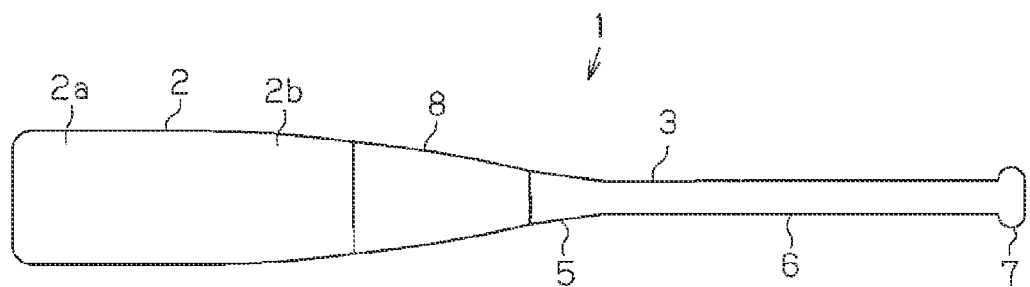
FIG. 1 is a side view of a bat.
Figure 2:
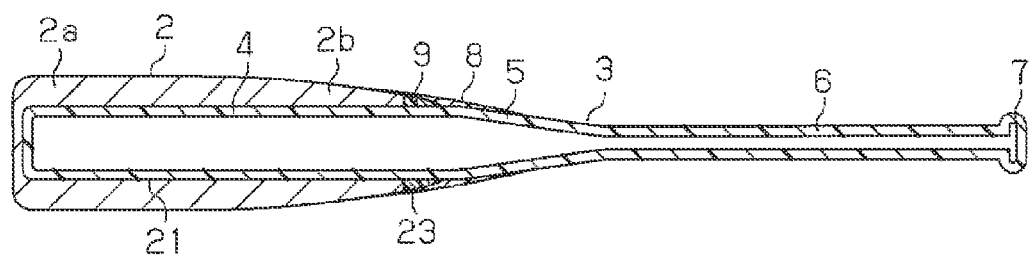
FIG. 2 is a cross-sectional view of the bat.
Figure 3:
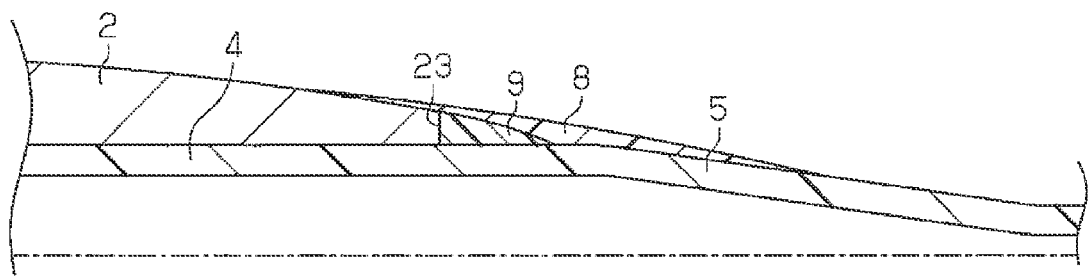
FIG. 3 is an enlarged cross-sectional view of the boundary portion between the batting portion and the suppressing member.

As shown in FIGS. 1 to 3, the bat 1 of the present embodiment includes a batting portion 2, a bat main body 3, part of which is inserted in the batting portion 2, a suppressing member 9 arranged at the lower end of the batting portion 2, and a reinforcing portion 8, which is arranged on the outer circumference of the suppressing member 9. As shown in FIG. 1, the upper section of the batting portion 2 is formed into a straight shape having a constant outer diameter, and the lower section of the bat main body 3 is formed into a straight shape having a constant outer diameter smaller than the outer diameter of the batting portion 2. The section between the upper section of the batting portion 2 and the lower section of the bat main body 3 has a tapered shape in which the outer diameter gradually decreases toward the lower end. As shown in FIG. 2, the lower end of the batting portion 2 is arranged at a position substantially in the upper half of the tapered portion of the bat 1.

The components constituting the bat 1 will now be described.

The batting portion 2 is made of wood and is formed in a cylindrical shape with a bottom and an open end. The wood used for the batting portion 2 is not particularly limited as long as the wood is of those generally used as baseball or softball bats. For example, the wood may be diffuse porous wood of broad leaved trees such as ash, swamp ash, white ash, and maple, or bamboo. The wood as material may be a single material, or a composite material including several types of woods.

Figure 5A:
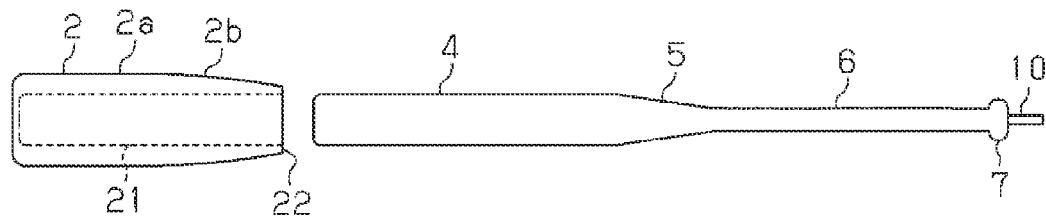
FIG. 5a is a view for explaining a method for manufacturing the bat, and shows the state before inserting the bat main body in the batting portion.

The outer circumferential surface of the batting portion 2 is formed into a shape that is applied to the batting portion of a generally used baseball or softball bat by cutting the wood. The batting portion 2 includes a batting straight portion 2a, the outer diameter of which does not change from the upper end to the lower end, and a batting tapered portion 2b, which is connected to the lower end of the batting straight portion 2a as shown in FIG. 2. The outer diameter of the batting tapered portion 2b gradually decreases from the upper end toward the lower end. Also, as shown in FIGS. 2 and 5a, a cavity 21 is formed inside the batting portion 2 by cutting a hole such that the inner diameters are constant from an opening 22 at the lower end of the batting portion 2 to the upper end of the batting portion 2.

The bat main body 3 made of a fiber-reinforced plastic includes a batting core portion 4, a grip portion 6, a tapered portion 5, which connects the batting core portion 4 and the grip portion 6, and a grip end portion 7, which is formed at the lower end of the grip portion 6. The batting core portion 4 is inserted in the cavity 21 of the batting portion 2. The tapered portion 5, the grip portion 6, and the grip end portion 7 are exposed from the batting portion 2.

The bat main body 3 is formed into a hollow shape by winding a prepreg of a fiber-reinforced plastic about a mandrel several times. The wall thickness of the bat main body 3 is constant from the batting core portion 4 to the grip end portion 7.

The batting core portion 4 of the bat main body 3 is cylindrical. The outer diameter of the batting core portion 4 is constant in the longitudinal direction of the bat main body 3, and corresponds to the inner diameter of the cavity 21 of the batting portion 2. Thus, when the bat main body 3 is inserted in the cavity 21 of the batting portion 2, the outer circumferential surface of the batting core portion 4 contacts the inner circumferential surface of the cavity 21.

The grip portion 6 of the bat main body 3 is also cylindrical like the batting core portion 4, and has a constant outer diameter in the longitudinal direction of the bat main body 3. The tapered portion 5, which extends between the batting core portion 4 and the grip portion 6, has an outer diameter that decreases from the batting core portion 4 toward the grip portion 6. The grip end portion 7 having an outer diameter greater than the outer diameter of the grip portion 6 is formed at the lower end of the grip portion 6. In the bat main body 3, the outer circumferential surfaces of the batting core portion 4, the tapered portion 5, and the grip portion 6 are continuous, and form a smooth surface without any step or protrusion as shown in FIG. 5a.

As shown in FIGS. 2 and 3, when the batting core portion 4 of the bat main body 3 is inserted in the cavity 21 of the batting portion 2, the tapered portion 5 of the bat main body 3, the grip portion 6, and the grip end portion 7 are exposed from the cavity 21 of the batting portion 2. Since the lower end of the batting portion 2 has a thickness in the radial direction, a step 23 is formed at the boundary portion between the lower end of the batting portion 2 and the tapered portion 5.

The suppressing member 9 is arranged on the outer circumference of the boundary portion between the lower end of the batting portion 2 and the tapered portion 5 to fill the step 23. Although not particularly limited, the suppressing member 9 is formed of material such as a fiber-reinforced plastic and a thermoplastic resin. The suppressing member 9 needs to be formed of material that inhibits expansion of the bat main body 3 formed of the fiber-reinforced plastic in the radial direction when heating the bat 1 in the metal mold under pressure. That is, the suppressing member 9 is formed of material that functions to inhibit changes in the orientation of fibers in the fiber-reinforced plastic at sections above and below the step 23. The material has the property that when, for example, pressure having an air pressure of 15 kg/cm² is applied to the material, the volume preservation rate is greater than or equal to 95%.

Figure 4A:
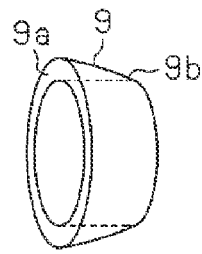
FIG. 4a is a perspective view of the suppressing member.
Figure 4B:
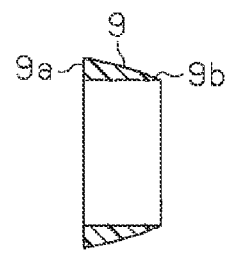
FIG. 4b is a cross-sectional view of the suppressing member.

The suppressing member 9 is formed into a ring as shown in FIGS. 4a and 4b. An upper end 9a of the suppressing member 9 is relatively thick in the radial direction, and the radial thickness of the suppressing member 9 is gradually decreased from the upper end 9a toward a lower end 9b. The radial thickness of the upper end 9a is substantially the same as the radial thickness of the lower end of the batting portion and the dimension of the step 23. Also, the inner circumferential surface of the suppressing member 9 has the shape and the size that allows sliding motion with respect to the upper outer circumferential surface of the tapered portion 5 of the bat main body 3.

In the bat 1, the reinforcing portion 8 is laminated on the outer circumference of the suppressing member 9. The reinforcing portion 8 extends upward and downward from the boundary portion between the batting tapered portion 2b of the batting portion 2 and the tapered portion 5 of the bat main body 3, and covers part of the lower section of the batting portion 2 and part of the upper section of the tapered portion 5. Although not particularly restricted, the reinforcing portion 8 is formed of, for example, material such as a fiber-reinforced plastic, a thermoplastic resin, or metal. In the case with the fiber-reinforced plastic, any of fiber-reinforced plastics formed of reinforcing fiber including carbon fiber, glass fiber, and aramid fiber is selected as necessary. Also, in the case with the thermoplastic plastic, any of an ABS plastic, a nylon plastic, an urethane plastic, an EVA plastic, a polyethylene plastic, a polypropylene plastic, and a polycarbonate plastic is selected as necessary. Furthermore, in the case with the metal, any of aluminum, magnesium, titanium, stainless-steel, and iron and steel (chrome molybdenum steel, mild steel) is selected as necessary.

The bat 1 includes the batting portion 2, the bat main body 3 inserted in the batting portion 2, the suppressing member 9 arranged on the outer circumferential surface of the bat main body 3, and the reinforcing portion 8 arranged about the boundary portion between the batting portion 2 and the bat main body 3. The bat 1 has an outer circumferential surface extending continuously from the batting portion 2 to the grip portion 6, and has a smooth outer shape without a step or a protrusion as shown in FIG. 1.

(Operation)

The operation of the bat 1 according to the above illustrated present embodiment will be described below.

The upper end 9a of the suppressing member 9 contacts the step 23 between the lower end of the batting portion 2 and the tapered portion 5 of the bat main body 3. The dimension of the step 23 and the thickness of the upper end 9a of the suppressing member 9 are substantially the same. Therefore, the upper end 9a of the suppressing member 9 operates to fill the step 23 formed in the radial direction at the boundary portion between the batting portion 2 and the bat main body 3. The thickness of the suppressing member 9 is formed to gradually decrease from the upper end 9a toward the lower end 9b. Thus, in a state in which the bat main body 3 before being heated under pressure is inserted in the batting portion 2, the outer circumferential surface of the suppressing member 9 extends continuously from the outer circumferential surface of the batting portion 2 to the outer circumferential surface of the tapered portion 5 of the bat main body 3. Therefore, when the interior of the bat main body 3 is heated under pressure to form the bat 1 in the metal mold, the suppressing member 9 inhibits the bat main body 3 from being expanded in the radial direction in the vicinity of the boundary portion between the lower end of the batting portion 2 and the tapered portion 5 of the bat main body 3. As a result, the suppressing member 9 operates to inhibit the orientation of fibers in the fiber-reinforced plastic from being changed in the vicinity of the boundary portion. Also, the outer circumferential surfaces of the batting portion 2, the suppressing member 9, and the bat main body 3 form a continuous surface without a step.

The reinforcing portion 8 is laminated on the outer circumferential surface of the suppressing member 9 to cover part of the lower section of the batting portion 2 and part of the upper section of the tapered portion 5. Thus, the reinforcing portion 8 operates to complement the function of the suppressing member 9. That is, the reinforcing portion 8 operates to enhance the effect of the suppressing member 9, and further reinforces the boundary portion.

Also, the reinforcing portion 8 covers part of the lower section of the batting portion 2 and part of the upper section of the tapered portion 5 so that the outer circumferential surface from the batting portion 2 to the tapered portion 5 becomes a continuous smooth surface.

(Method for Manufacturing Bat 1)

Figure 5B:
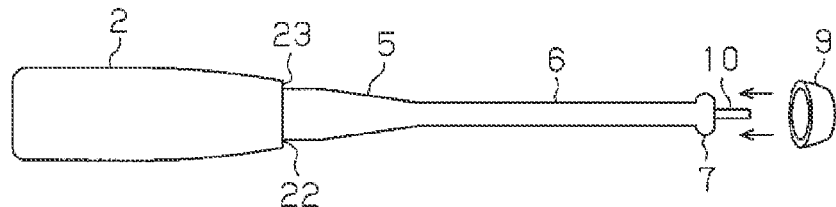
FIG. 5b is a view for explaining the method for manufacturing the bat, and shows the step for arranging the suppressing member.

A method for manufacturing the bat 1 will now be described with reference to FIGS. 5a to 5c. First, as shown in FIG. 5a, the batting portion 2 is formed by cutting wood of an appropriate size. The wood used for the batting portion 2 may be a single material, or a compound material formed by adhering pieces of wood, or a waste material formed of several kinds of wood. The wood has a square cross-section 100 mm on a side, and a length of approximately 400 mm. The wood is cut and ground such that the outer shape corresponds to the batting portion 2 of the bat 1. Thus, the batting portion 2 is formed to include the batting straight portion 2a having a constant outer diameter from the upper end to the lower end, and the batting tapered portion 2b, which is connected to the lower end of the batting straight portion 2a. The outer diameter of the batting tapered portion 2b gradually decreases from the upper end to the lower end.

The cavity 21 is formed by cutting a constant bore having an inner diameter of approximately 25 mm upward from the radially central portion of the lower end of the batting portion 2. Thus, the opening 22 is formed at the lower end of the batting portion 2, and the batting portion 2 having a cylindrical shape with a bottom and an open end is formed. Also, the outer circumferential surface of the opening 22 of the batting portion 2 may be chamfered to a predetermined dimension as needed.

Then, the bat main body 3 made of a fiber-reinforced plastic is formed by winding a prepreg of a fiber-reinforced plastic several times about a mandrel having a predetermined shape. In this process, a mandrel having a shape corresponding to the entire shape of the bat main body 3 may be used. Alternatively, mandrels having shapes of divided bat main body 3 may be prepared as necessary, and prepregs may be wound about the divided mandrels. The prepregs having predetermined shapes are wound about predetermined positions on the mandrels as necessary.

The fiber-reinforced plastic is a composite material that has enhanced strength by impregnating reinforcing fiber such as carbon fiber with a molding resin such as a thermosetting resin. As the reinforcing fiber for forming the prepreg, carbon fiber, glass fiber, various types of ceramic fiber, boron fiber, metal fiber, such as copper and stainless-steel, amorphous fiber, organic fiber such as aromatic polyamide, or a mixture thereof may be used as necessary. The orientation of fibers in the fiber-reinforced plastic forming the prepreg is not particularly restricted. However, it is preferable to combine and wind a straight layer formed of fibers extending parallel to the longitudinal direction of the bat 1, and a bias layer formed of fibers intersecting the longitudinal direction of the bat 1 at an angle of 45 degrees as necessary to ensure the strength of the bat 1.

In this manner, the prepreg is wound about the mandrel several times so that the bat main body 3 made of the fiber-reinforced plastic is formed as shown in FIG. 5*a*. Thereafter, the mandrel is pulled out of the bat main body 3, and a retractable elastomer tube 10 is inserted inside the bat main body 3 having a hollow cylindrical shape.

Then, the bat main body 3, in which the elastomer tube 10 is provided, is inserted in the cavity 21 of the batting portion 2 through the opening 22 of the batting portion 2 as shown in FIG. 5*a*. At this time, an adhesive is applied to the outer circumferential surface of the batting core portion 4 of the bat main body 3 and the inner circumferential surface of the batting portion 2 in advance. By inserting the bat main body 3 in the cavity 21 of the batting portion 2, the batting core portion 4, which is the upper section of the bat main body 3, is inserted in the cavity 21 of the batting portion 2 as shown in FIG. 5*b*. At this time, the tapered portion 5, the grip portion 6, and the grip end portion 7 are exposed from the batting portion 2. Also, the lower end of the batting portion 2 has a radial thickness, and thus the step 23 is formed at the boundary portion between the lower end of the batting portion 2 and the tapered portion 5 of the bat main body 3.

A method for arranging the suppressing member 9 will now be described. The suppressing member 9 is formed into a ring shape in advance by winding a prepreg of a fiber-reinforced plastic about a mandrel that corresponds to the outer circumference shape of the upper section of the tapered portion 5 of the bat main body 3 by a predetermined number of times and heating the prepreg. The lower end of the bat main body 3 is inserted in thus formed suppressing member 9 as shown in FIG. 5*b*. The suppressing member 9 is then arranged on the outer circumference of the bat main body 3 such that the upper end 9*a* of the suppressing member 9 abuts against the step 23 of the batting portion 2. The inner circumferential surface of the suppressing member 9 slides against the outer circumferential surface of the tapered portion 5 of the bat main body 3.

Figure 5C:
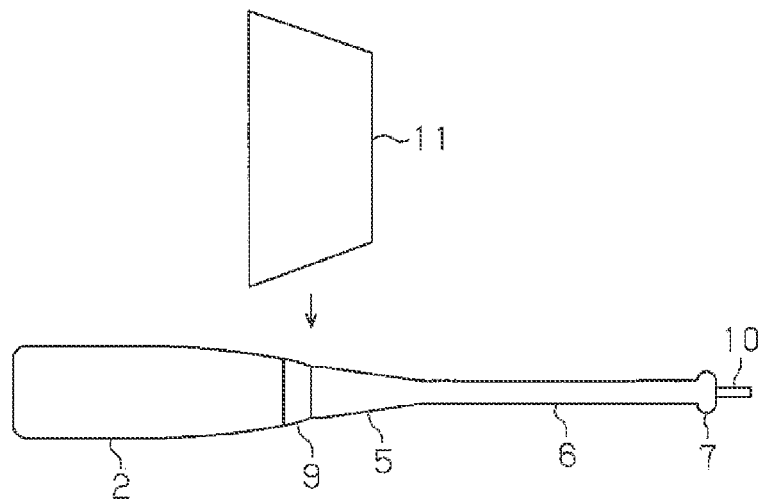
FIG. 5c is a view for explaining the method for manufacturing the bat, and shows the step for covering with the reinforcing portion.

Then, the reinforcing portion 8 is formed by winding a tape 11 several times around the outer circumference of part of the lower section of the batting tapered portion 2*b* of the batting portion 2, the outer circumference of the suppressing member 9, and the outer circumference of part of the upper section of the tapered portion 5 of the bat main body 3 as shown in FIG. 5*c*. Although not particularly restricted, material such as a fiber-reinforced plastic, a thermoplastic resin, and metal that has excellent adhesion performance with the bat main body 3 and the batting portion 2 is suitable for the tape 11. Furthermore, although not particularly restricted, the covering widths of parts of the batting portion 2 and the bat main body 3 covered by the tape 11 are determined to ensure the strength of the reinforcing portion 8, to ensure the batting surface of the batting portion 2, and to reduce concentration of stress applied to the boundary portion between the batting portion 2 and the bat main body 3. In this embodiment, the covering widths are determined such that part of the tapered portion 5 covered by the reinforcing portion 8 is greater than part of the batting portion 2 covered by the reinforcing portion 8 in the longitudinal direction of the bat 1.

Thereafter, in a state in which the elastomer tube 10 is provided inside the bat main body 3, the bat main body 3 is arranged in the metal mold for molding the bat. After closing the metal mold, compressed air is injected in the elastomer tube 10 so that the elastomer tube 10 is expanded. Accordingly, the fiber-reinforced plastic forming the bat main body 3 is brought into close contact with the inner circumferential surface of the batting portion 2. The batting portion 2, the bat main body 3, the suppressing member 9, and the reinforcing portion 8 are joined by heating the metal mold in this state, and the integrally molded bat 1 is obtained.

Since the bat 1 is formed by heating under pressure, the suppressing member 9 and the reinforcing portion 8 closely contacts the batting portion 2 and the bat main body 3. Thus, the bat 1 is formed to have the outer circumferential surface that continuously extends from the batting portion 2 to the grip portion 6, and has an outer shape, which is a smooth surface without a step or a protrusion as shown in FIG. 1.

(Advantages)

The above illustrated present embodiment has the following advantages.

(1) The thickness of the upper end 9*a* of the suppressing member 9 is substantially the same as the dimension of the step 23. Therefore, since the suppressing member 9 operates to fill the step 23, the bat main body 3 is inhibited from being expanded in the radial direction at the step 23. Thus, the orientation of fibers in the fiber-reinforced plastic forming the bat main body 3 is inhibited from being changed in the vicinity of the step 23, and the strength of the bat 1 at the boundary portion between the batting portion 2 and the tapered portion 5 of the bat main body 3, that is, the strength of the joint surface between the different materials is improved in a suitable manner. Therefore, the concentration of stress that acts on the joint surface between the different materials when batting at the batting portion 2 is avoided, and the shock resistance and the durability of the bat 1 are improved.

(2) The reinforcing portion 8 operates to complement the function of the suppressing member 9 by arranging the reinforcing portion 8 on the outer circumference of the suppressing member 9. That is, the reinforcing portion 8 further enhances the advantage of the suppressing member 9 in increasing the strength.

(3) The reinforcing portion 8 operates to form the outer circumferential surface from the batting portion 2 to the tapered portion 5 as a continuous smooth surface. Since the appearance profile of the bat 1 is improved, the bat 1 that is excellent in the appearance and design is provided.

(4) The suppressing member 9 is arranged to abut against the step 23 of the batting portion 2 from the lower end of the bat main body 3. Thus, the step 23 serves as a positioning portion for the suppressing member 9, and the suppressing member 9 is arranged at a proper position.

The above illustrated embodiment may be modified as follows, and the following modifications may also be combined.

Figure 6A:
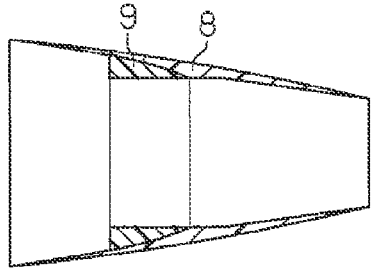
FIG. 6a is a cross-sectional view illustrating the suppressing member and the reinforcing portion according to the present embodiment.
Figure 6C:
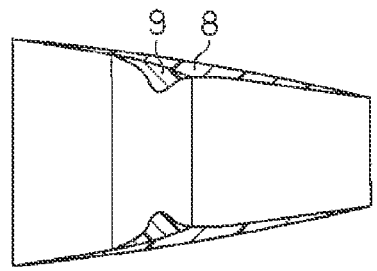
FIGS. 6b, 6c, and 6d are cross-sectional views illustrating modifications of the suppressing member and the reinforcing portion.
Figure 6B:
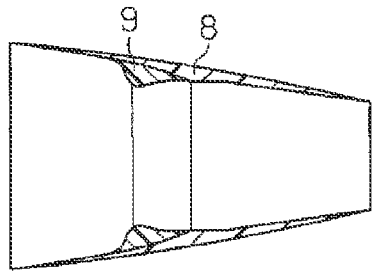

In the manufacturing method of the bat according to the above illustrated embodiment, the reinforcing portion 8 and the suppressing member 9 are arranged in separate processes as separate members as shown in FIG. 6*a*. However, the reinforcing portion 8 and the suppressing member 9 may be integrally formed and arranged in one process as shown in FIG. 6*b*. In this case, the reinforcing portion 8 and the suppressing member 9 may be formed integrally as a ring-shaped member in advance. After the lower section of the bat main body 3 is inserted in the ring-shaped member, and the ring-shaped member is moved until it abuts against the step 23 of the batting portion 2 to determine the position, the bat main body 3 may be heated under pressure in the metal mold. Alternatively, the reinforcing portion 8 and the suppressing member 9 may be integrally formed by winding the tape 11.

In the manufacturing method for a bat according to the above illustrated embodiment, after arranging the suppressing member 9 by abutting the suppressing member 9 against the step 23, the reinforcing portion 8 is laminated on the outer circumference of the suppressing member 9. However, the process for providing the reinforcing portion 8 and the suppressing member 9 is not limited to this method. For example, after providing the reinforcing portion 8 by winding the tape 11 about the outer circumference of the batting portion 2 and the tapered portion 5, the suppressing member 9 that is formed into a ring shape may be inserted into the reinforcing portion 8 and abut against the step 23.

In the above illustrated embodiment, after forming the suppressing member 9 into a ring shape in advance, the suppressing member 9 is inserted from the grip end portion 7 of the bat main body 3. The prepreg may be directly wound about and laminated on the outer circumference of the upper section of the tapered portion 5 of the bat main body 3 to arrange the suppressing member 9.

The covering widths of parts of the batting portion 2 and the tapered portion 5 covered by the reinforcing portion 8 may be changed as necessary. In the above illustrated embodiment, the covering widths are determined such that the width of part of the tapered portion 5 covered by the reinforcing portion 8 is greater than the width of part of the batting portion 2 covered by the reinforcing portion 8 in the longitudinal direction of the bat 1. In contrast, the covering widths may be determined such that the width of part of the batting portion 2 covered by the reinforcing portion 8 is greater than the width of part of the tapered portion 5 covered by the reinforcing portion 8. Also, the covering widths may be the same.

Figure 6D:
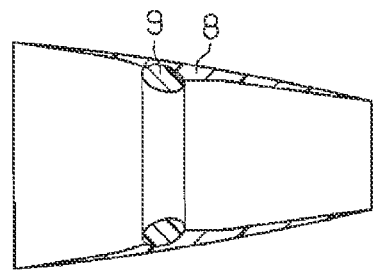
Figure 7A:
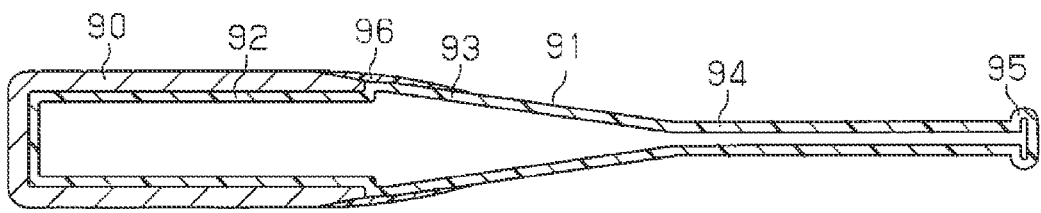
FIG. 7a is a cross-sectional view of a conventional bat.
Figure 7B:
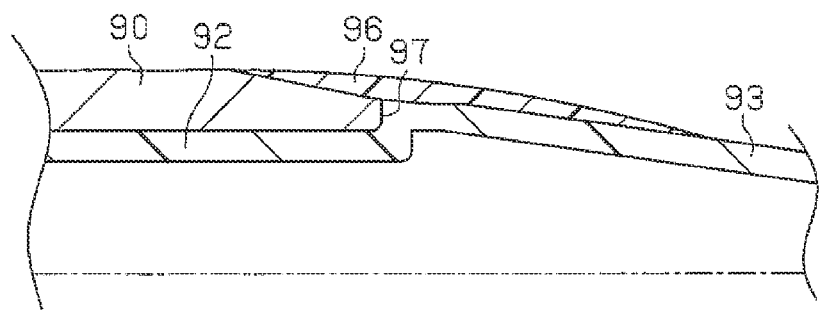

The shape of the suppressing member 9 may be changed as necessary. The suppressing member 9 does not need to be formed such that the upper end 9a of the suppressing member 9 abuts against the step 23, and that the radial thickness decreases toward the lower end 9b of the suppressing member 9. As shown in FIG. 6c, the suppressing member 9 may be formed into a ring having a protrusion that protrudes radially inward at the center portion of the suppressing member 9 in the longitudinal direction of the bat 1 such that the transverse cross-sectional shape is symmetrical. Alternatively, the suppressing member 9 may be formed into a ring having a circular cross-section as shown in FIG. 6d. These suppressing members may be formed integrally with the reinforcing portion 8, and may also be formed as separate members.

In the above illustrated embodiment, the suppressing member 9 is arranged only on the outer circumference of the bat main body 3 exposed from the batting portion 2. However, the position of the suppressing member 9 is not limited to this. The suppressing member 9 may be arranged to extend from the outer circumference of the bat main body 3 exposed from the batting portion 2 to the outer circumference of the batting portion 2. Alternatively, part of the suppressing member 9 may be arranged on the outer circumference of the bat main body 3 exposed from the batting portion 2, while other part of the suppressing member 9 is inserted between the cavity 21 of the batting portion 2 and the batting core portion 4 of the bat main body 3.

The reinforcing portion 8 may be omitted. In this case, after the lower end of the bat main body 3 is inserted in the suppressing member 9 and the suppressing member 9 abuts against the step 23 of the batting portion 2, the bat main body 3 is heated under pressure in the metal mold.

In the bat 1 according to the above illustrated embodiment, the lower end (step 23) of the batting portion 2 formed of wood is arranged at a position substantially in the upper half of the tapered portion of the bat 1. That is, the boundary portion between the batting portion 2 and the bat main body 3 is located at substantially the center portion of the tapered portion of the bat 1. However, the lower end of the batting portion 2 may be arranged at a position further upward of the tapered portion of the bat 1, and may be arranged at the boundary portion between the straight portion at the upper section of the bat 1 and the tapered portion. Alternatively, the lower end of the batting portion 2 may be arranged to be located further downward of the tapered portion of the bat 1, and may be arranged to be located at the straight portion at the lower section of the bat 1.

In the above illustrated embodiment, the fiber-reinforced plastic forming the bat main body 3 includes the straight layer that is formed of fibers extending parallel to the longitudinal direction of the bat 1 and the bias layer that is formed of fibers that intersect the longitudinal direction at an angle of 45 degrees. However, the fiber-reinforced plastic forming the bat main body 3 may include a hoop layer that is formed of fibers that intersect the longitudinal direction at an angle of 90 degrees.

Therefore, the present examples and embodiments are to be considered as illustrative and not restrictive and the invention is not to be limited to the details given herein, but may be modified within the scope and equivalence of the appended claims.

The invention claimed is:

1. A baseball or softball bat including a batting portion formed of wood into a cylindrical shape, and a bat main body made of a fiber-reinforced plastic, a part of the bat main body being inserted in the batting portion from an open end of the batting portion, and the rest of the bat main body being exposed from the batting portion, the baseball or softball bat comprising:
   a suppressing member arranged on an outer circumference of the bat main body, wherein the suppressing member prevents change of orientation of fibers in the fiber-reinforced plastic;
   wherein the suppressing member is positioned so as to contact a step formed between the outer circumference of the bat main body and an outer circumference of the batting portion at the open end of the batting portion,
   wherein the bat main body includes:
      a batting core portion having a constant outer diameter in a longitudinal direction of the bat main body;
      a grip portion having a constant outer diameter in the longitudinal direction of the bat main body, the outer diameter of the grip portion being smaller than that of the batting core portion; and
      a tapered portion extending between the batting core portion and the grip portion, and having an outer diameter that decreases from the batting core portion toward the grip portion, wherein outer circumferential surfaces of the batting core portion, the tapered portion, and the grip portion are continuous and form a smooth surface and wherein the suppressing member is arranged on the outer circumference of the batting core portion in a vicinity of the tapered portion of the bat main body, and wherein the radial thickness of the suppressing member decreases as the distance from the batting portion is increased.

2. The baseball or softball bat according to claim 1, further comprising a reinforcing portion arranged on the outer circumference of the suppressing member, wherein the reinforcing portion reinforces the joint between the batting portion and the bat main body.

3. The baseball or softball bat according to claim 2, wherein the suppressing member and the reinforcing portion are integrally formed.

4. A method for manufacturing a baseball or softball bat, wherein the bat includes a batting portion formed of wood into a cylindrical shape, and a bat main body made of a fiber-reinforced plastic, a part of the bat main body being inserted in the batting portion from an open end of the batting portion, and the rest of the bat main body being exposed from the batting portion, wherein the bat main body includes:

a batting core portion having a constant outer diameter in a longitudinal direction of the bat main body;

a grip portion having a constant outer diameter in the longitudinal direction of the bat main body, the outer diameter of the grip portion being smaller than that of the batting core portion; and a tapered portion extending between the batting core portion and the grip portion, and having an outer diameter that decreases from the batting core portion toward the grip portion, wherein outer circumferential surfaces of the batting core portion, the tapered portion, and the grip portion are continuous and form a smooth surface and wherein the suppressing member is arranged on the outer circumference of the batting core portion in a vicinity of the tapered portion of the bat main body, and wherein the radial thickness of the suppressing member decreases as the distance from the batting portion is increased;

the manufacturing method comprising:

inserting the bat main body in the batting portion;

mounting a suppressing member on an outer circumference of the bat main body such that the suppressing member contacts a step formed between the outer circumference of the bat main body and an outer circumference of the batting portion at the open end of the batting portion, wherein the suppressing member prevents change of orientation of fibers in the fiber-reinforced plastic; and molding the bat by arranging the batting portion, the bat main body, and the suppressing member in a metal mold and heating under pressure.

5. The method for manufacturing a baseball or softball bat according to claim 4, wherein the mounting the suppressing member includes:

covering the outer circumference of the suppressing member, which is the outer circumference of the boundary portion between the batting portion and the bat main body, by a reinforcing portion.

* * * * *